Patented Nov. 27, 1951

2,576,462

UNITED STATES PATENT OFFICE 2,576,462

RECOVERY OF VANADIUM VALUES FROM WASTE LIQUORS

Franklin L. Kingsbury, Westfield, and Frank J. Schultz, Fords, N. J., assignors to National Lead Company, New York, N. Y., a corporation of New Jersey No Drawing. Application September 18, 1948, Serial No. 49,996

2 Claims. (Cl. 23—19)

The present invention relates to the recovery of valuable impurities contained in industrial waste acid liquors. It has particular reference to the recovery of vanadium values from waste acid liquors which result from the manufacture of titanium dioxide pigments. More specifically, it is related to a process for the recovery of vanadium values from the ferrous sulfate removed from such and other waste acid liquors.

Ilmenite is the titaniferous ore most commonly utilized as raw material for the manufacture of titanium dioxide pigments by processes which include solubilizing the ore with sulfuric acid to form sulfate solutions of the ilmenite followed by hydrolytic precipitation of hydrous titanium oxide from such solutions. Most naturally occurring ilmenites contain as impurities small amunts of vanadium and other metals, e. g. titanium, chromium, manganese, columbium, tantalum, molybdenum and rare earth elements, which, after hydrolysis of the ilmenite solutions are practically all found in the waste sulfuric acid hydrolysis mother liquor.

It is well known in the prior art that vanadium values are precipitated presumably as basic sulfates along with the ferrous sulfate monohydrate in the concentration of the waste sulfuric acid liquors, but no method for the subsequent recovery of vanadium values from the mixed precipitate has been described in the prior art.

An object of the present invention therefore, is to provide a method for the recovery of the vanadium values from ferrous sulfate monohydrate. Another object is to provide an orderly and economical method for the direct separation of the vanadium values from the bulk of the iron in the ferrous sulfate monohydrate. A still further object is to directly recover pure copperas. These and other objects will be apparent from the following description of the present invention.

In its broadest aspect, the present invention contemplates treating precipitates of ferrous sulfate monohydrate containing vanadium values presumably as basic sulfates with sufficient water to affect a direct change-in-phase of the monohydrate to ferrous sulfate heptahydrate (copperas) and to form a thick slurry with the ferrous sulfate crystals, and, thereafter, upon completion of the change-in-phase reaction, separating the copperas crystals from the liquid of the slurry, which liquid will contain the vanadium values in all probability as vanadium sulfate.

In practicing the invention, the ferrous sulfate monohydrate crystals obtained, for example, from waste sulfuric acid liquids, by concentration of such liquids, is treated with the desired amount of water in any suitable container, preferably one in which the change-in-phase conversion may be carried out at slightly elevated temperature. The amount of water to be added will, according to the invention, be no more than is required to supply the necessary additional water of crystallization to convert monohydrate to the heptahydrate and, in addition, to form a slurry in which the heptahydrate crystals will be suspended. For every one part $FeSO_4.H_2O$ by weight in the ferrous sulfate monohydrate to be treated according to the invention, 0.63 parts of $H_2O$ will be required to effect the conversion to $FeSO_4.7H_2O$. The amount of additional water required to form a thick slurry will not be in excess of double that amount; that is to say, an additional 0.63 parts of water, or a total of 1.27 parts for 1 part $FeSO_4.H_2O$ in the precipitate. Generally speaking, only about two-thirds of the amount of water required for conversion is necessary to form the slurry, for instance, about 0.425 part or a total of 1.06 parts of water for each one part $FeSO_4.H_2O$. A pratical operating ratio for most applications is one part water for one part $FeSO_4 \cdot H_2O$, and on occasions, satisfactory slurries may be prepared using only ½ as much water to form a slurry as is required to effect the change-in-phase reaction; that is to say, about 0.32 part, or a total of about 0.95 part for one part of $FeSO_4.H_2O$.

The mixing of the water with the monohydrate precipitate may be effected in any convenient manner, preferably mechanical agitation. The monohydrate crystals should be left in contact with the water until the change-in-phase reaction is complete. Carrying out the operation of the invention at a slightly elevated temperature, say between 45° F. and 80° F. hastens the conversion, but the higher the temperature, the more ferrous sulfate will be dissolved in the liquid phase of the slurry. The invention should be operated in such manner as to effect as rapid conversion as possible with a minimum dissolution of ferrous sulfate. One hour at about 45° F. has been found quite satisfactory in this connection.

When the conversion is complete, the crystals of ferrous sulfate heptahydrate are removed from the liquid phase of the slurry as by filtration or centrifuging in order to effect as complete recovery as possible of the vanadium values which will be found dissolved in the liquid phase of the slurry, the copperas crystals should be washed with cold water, preferably water cooled to near the freezing point say about 35° F.

After separation of the copperas crystals, the liquid phase, i. e. filtrate and wash waters, may be processed in any convenient manner for the recovery of the vanadium values contained therein.

The following examples will further illustrate the present invention.

*Example I*

A quantity of ferrous sulfate monohydrate crystals obtained from the concentration of the waste sulfuric acid hydrolysis mother liquor containing about 57 grams $FeSO_4.H_2O$, some adhering waste acid and 0.2 gram of vanadium presumably as sulfate, calculated as vanadium, were placed in a metal container with 50 ml. of water, the mass stirred at about 80° F. After one hour, the change-in-phase from the monohydrate to the heptahydrate was complete, and at the same time, substantially all of the vanadium compounds had gone into solution in the liquid phase of the slurry. Copperas crystals were filtered off and washed with 100 mls. of water cooled to 35° F. The combined filtrate and wash water upon analysis was found to contain all of the vanadium values, i. e., 0.2 gram calculated as vanadium, and about 6.5 grams $FeSO_4$. The copperas weighed, wet, 91 grams.

*Example II*

Upon repeating Example I carrying out the conversion at 45° F. the same recovery of vanadium values was obtained, but the amount of dissolved iron was reduced to 3.3 grams $FeSO_4$.

Generally speaking, the practice of the present invention, recovery of vanadium values in the order of about 95% are obtained.

When other metal values such as titanium, chromium, manganese, columbium, tantalum, molybdenus and rare earth elements are present in the monohydrate crystals, they likewise are removed with the vanadium in the liquid phase of the slurry during the change-in-phase reaction.

While this invention has been described and illustrated by the examples given, it is not intended to be limited thereto and other modifications and variations may be employed within the scope of the following claims.

We claim:
1. Method for the separation of vanadium values from a precipitated ferrous sulfate monohydrate containing the same which comprises adding to said monohydrate water in an amount such that for every one part of monohydrate by weight from about 0.95 part to about 1.27 parts water will be added, maintaining the resultant slurry at a temperature between about 45° F. and about 80° F. for about one hour to form solid ferrous sulphate heptahydrate, then separating the liquid phase of said slurry containing dissolved therein the vanadium values from the solid ferrous sulfate heptahydrate.

2. Method for the separation of vanadium values from a precipitated ferrous sulfate monohydrate containing the same which comprises admixing said monohydrate with water to convert the monohydrate to heptahydrate, said water being employed in an amount such that for every one part of monohydrate by weight from about 0.95 part to about 1.27 parts water are added to convert the monohydrate to heptahydrate in a slurry environment, then separating the heptahydrate crystals from the liquid phase of said slurry containing dissolved therein the vanadium values.

FRANKLIN L. KINGSBURY.
FRANK J. SCHULTZ.

REFERENCES CITED

The following references are of record in the file of this patent:

UNITED STATES PATENTS

| Number | Name | Date |
|---|---|---|
| 1,667,693 | Stewart | Apr. 24, 1928 |
| 1,843,779 | McWhorter | Feb. 2, 1932 |
| 2,259,396 | Schlecht et al. | Oct. 14, 1941 |
| 2,413,492 | Firth | Dec. 31, 1946 |
| 2,440,215 | Allen et al. | Apr. 20, 1948 |

FOREIGN PATENTS

| Number | Country | Date |
|---|---|---|
| 46,611 | Sweden | Mar. 3, 1920 |
| 47,284 | Sweden | July 7, 1920 |
| 50,847 | Sweden | Dec. 21, 1921 |
| 157,555 | Great Britain | Oct. 14, 1941 |

OTHER REFERENCES

Mellor, "Comprehensive Treatise on Inorganic and Theoretical Chemistry," vol. 14, page 248 (1935), Longmans, Green & Co., New York city.

Comey and Hahn, "A Dictionary of Chemical Solubilities, 2nd Edition" page 1031 (1921), Macmillan Co., New York city.